3,185,599
PROCESS OF PRODUCING WELDING FLUXES
Carl Arnold, Stuttgart, and Heinrich Brandt, Wiehl, Bezirk Cologne, Germany, assignors to Deutsche Flux G.m.b.H., Montabaur, Westerwald, Germany
No Drawing. Continuation of application Ser. No. 427,664, May 4, 1954. This application Feb. 25, 1963, Ser. No. 260,876
Claims priority, application Germany, May 8, 1953, D 15,011
5 Claims. (Cl. 148—26)

The present application is a continuation application of our copending application, Serial No. 427,664, filed May 4, 1954, now abandoned, entitled "Process of Producing Welding Fluxes."

The present invention relates to the production of a new and useful welding flux product and more particularly to welding fluxes used with shielded or submerged arc-welding.

The known welding fluxes which are used for shielded arc welding are in general sold in various grain size and are suitable only for specific application purposes. Therefore depending upon the purpose, it is normally necessary to obtain a welding flux of a suitable grain size.

The grains of the welding flux were prior to the present invention obtained by mechanically subdividing a previously molten and then solidified mixture of welding flux materials, normally referred to as pre-fused fluxes of chemically homogeneous nature, and then sifting or screening the thus obtained grains. Instead of melting and solidifying the mixture of fluxing material components, it has also been proposed to solidify a uniform conglomerate liquid mixture of the fluxing material components or to sinter together the components and then to subdivide the solidified mass to small particles and sift the particles to separate dust-like particles therefrom.

The subdividing of the solidified or sintered mass was accomplished by forceful mechanical means in mills, crushers, and the like, whereby a not inconsiderable proportion of the mass becomes dust-like. This dust portion is either lost during sifting or it can be utilized for further production by utilization thereof as a raw material. Either case involves disadvantages particularly from the point of view of economy.

Even in the case of universal welding fluxes which consist of a mixture of various grain sizes, the most finely divided portion should not be of such small size as to be considered dust particles in order to avoid the troublesome and unhealthy evolution of dust upon welding. Moreover, the dust obstructs the removal of the gas through the fluxing agent during the welding process. In addition it is possible that too great a proportion of dust can stop up the exhaust equipment of the welding arrangement.

With the known homogeneous pre-fused welding fluxes, the proportion of dust may be up to 30% of the total mass which results in costs, additional work and a poor utilization of the fluxing agent. Moreover, with the known non-homogeneous welding fluxes there is the definite danger of unmixing, or separation of the components of the welding flux, especially upon storage for a long time. All of the dust cannot be separated, mainly because the dust contains the major proportion of the most important components of the fluxing agents. Also in the case of other welding fluxes wherein the fluxing agent in finely divided form is added after the mechanical subdivision, there is still the danger of unmixing. The danger of unmixing is always present with the heterogeneous welding fluxes because the individual components, into which the welding fluxes after the mechanical subdivision again partially separate, have various specific weights.

It is therefore a primary object of the present invention to provide a process of producing a welding flux product which avoids all of the above enumerated difficulties in connection with the known welding flux products.

It is still another object of the present invention to provide a process of producing welding flux granules of substantially uniform size wherein the welding flux components are uniformly distributed.

It is a further object of the present invention to provide a process of producing degasified welding fluxes of uniform composition.

It is still a further object of the present invention to provide a process of producing a novel welding flux product which is free of dust portions and therefore avoids all of the difficulties in connection with welding fluxes having a proportion of dust-like particles.

It is yet another object of the present invention to provide a process of producing welding fluxes, which process is adapted to be used with welding fluxes of any composition, wherein there is no waste in the production of the novel welding flux products.

Other objects and advantages of the present invention will be apparent from a further reading of the specification and of the appended claims.

With the above objects in view, the present invention is mainly concerned with a process of producing a welding flux product, comprising the steps of granulating or agglomerating a mixture of particles adapted to serve as a welding flux so as to form granules thereof, and heating the granules at a temperature sufficiently high to degasify the same while preventing substantial melting of the granules, thereby forming a degasified welding flux in the form of granules.

Generally during heating of the granules so as to degasify the same, at least a portion of the granules adhere to each other and these adhering masses must be broken up before utilization of the welding flux. However, these masses may be easily broken up into the original granules which were heated for the degasification.

Since it is desirable to have a final product wherein the granules are of a predetermined size and particularly wherein the granules are of uniform size, it is preferred according to the present invention to select from the formed granules only those granules which are within a predetermined size range ad to degasify the thus selected granules. If these granules adhere to each other upon heating for degasification, the breaking up of the mass of adhering granules results in degasified granules of substantially uniform size, since the mass breaks up into the original granules. The selection of granules within a predetermined size range may be easily accomplished by passing the granules through a sieve or sieves.

The granules which are larger than the predetermined size range may be mechanically subdivided and granulated with fresh raw material.

Good results have been achieved if the granulating procedure is stopped when the granules have a size of about 0.2 to 1.5 mm. The preferred size generally is about 0.6 to 1 mm. The most preferred size is approximately 0.3–2 mm.

The granulation of the mixture of particles adapted to serve as a welding flux may be carried out in the usual manner by mixing the particles with a liquid in such manner that small granules of the particles are formed. Thereafter the granules may be dried before being heated for degasification. The thus dried masses are actually granules containing the particles of welding flux material in uniform distribution. The preferred liquid is of course water from the point of view of ease of handling and economy. If it is desired to add a small percentage of certain ingredients to the mixture, for instance, such soluble in water, they may be added to the water or liquid used for granulating.

Preferably the water is added to the mixture of particles in the form of a stream, by means of a nozzle arrangement or the like, and preferably at a rate of about 0.6–1.4 liters of water per minute per each 100 kg. of the particles, and more preferably between 0.1–0.8 liter of water per minute per each 50 kg. of the mixture. Most preferably the rate is 0.5 liter of water per minute per 50 kg. of the mixture of particles. Of course the variation of the rate of introduction of the water during the granulation will vary the grain size of the granules. However, it has been found that the above values give the results which are most suitable for the purposes of the present invention.

It should be noted at this point that the process of the present invention may be utilized for the manufacture of a granulated welding flux product from any mixture of fluxing components and, although specific examples will be given in connection with specific compositions, the present invention is applicable to any other mixture of components and the invention is therefore not meant to be limited to any particular welding flux composition or compositions. The advantage of the present invention is not with respect to any particular composition but rather with respect to the fact that any composition may be transformed into a uniform welding flux product by a simple and easily controllable process.

Among the fluxing materials which may be utilized according to the process of the present invention are for example the relatively high melting point basic materials such as mullite, alumina, silica, zirconia, titanium dioxide, beryllia, calcium oxide, mixtures thereof, etc. In addition, known alloying additives, melting point depressants, deoxidizers, etc., may be added. Among the known additives materials are for example sodium silicate glass, iron oxide, borax, manganese compounds and alloys, elemental or alloyed silicon, aluminum, magnesium, nickel, cobalt, fluorides of calcium, lithium, sodium, potassium, cryolite, etc. Generally the basic flux ingredient or ingredients varies between 20–80 parts by weight and the additive makes up the rest of the flux.

The heating of the formed granules for the purpose of degasifying the same may be at any temperature sufficiently high to degasify the granules without substantially melting the same. Generally the temperature utilized is below 1000° C. and is preferably between about 900–1000° C. As stated previously, any granules which may be baked together by such heating can be easily broken up by simple mechanical means since the granules adhere to each other only by a relatively slight force which may be broken with a relatively low pressure. Furthermore, the breaking apart of these adhering granules does not result in the formation of any dust-like particles. The dust portion of the products of the present invention can without difficulty or extraordinary measures be easily maintained below 5%.

By adjusting the rate of the stream of water when mixing the water with the dry material for granulation to be approximately 0.5 liter per minute per each 50 kg. of dry particles, as much as 80% of the resulting granules are within the desired granular size range. The formed granules may be easily dried, for example in a drying apparatus provided with a hot air circulator, a conveyor passing through a drying apparatus, or even upon standing.

The heating for degasification may be carried out in any suitable apparatus such as a rotary furnace. The binding agent which according to the known processes of producing welding fluxes has the purpose of holding the mixture together in a substantially solid mass for the later mechanical subdividing of the same, can be done away with entirely in the process of the present invention.

Aside from the advantage that each granule produced according to the process of the present invention has practically the same composition as every other granule, the products produced by the present invention have the additional advantage of not unmixing or separating into the component parts even upon standing over long periods of time. It is thus possible to obtain more uniform and better welding utilizing the products of the present invention than with known products.

Another advantage of the present invention lies in the fact that expensive mechanical subdividing apparatuses which utilize a great amount of energy are unnecessary since the subdividing of the few adhering granules which form upon heating of the granules for degasification require only a slight amount of energy, particularly as compared to that required to break up molten fluxing agents which have been solidified. In addition, it is unnecessary to utilize dust removing devices in the formation of the welding flux products because there is practically no dust formed during the process.

Furthermore, the degasing of the welding flux granules according to the present invention by heating requires a much shorter heating time and results in correspondingly decreased costs. Moreover, the temperature of the heating for the purposes of degasification need not be controlled so strictly according to the process of the present invention than with prior processes. According to the known processes, if the temperature were too low, the mass remained too soft, which had an unfavorable effect on the development of dust. Utilizing temperatures which were somewhat too high, the mass became too hard, which upon forceful subdividing of the same also had an unfavorable effect on the formation of dust. Both of these difficulties are avoided by the process of the present invention so that strict control of the temperature is not necessary.

The following examples are given as illustrative only of the process of the present invention, the scope of the invention not however being meant to be limited to the specific compositions or the specific details of the examples.

*Example 1*

A mixture is made of particles of the following:

| | Kg. |
|---|---|
| Mullite | 20.3 |
| Clay | 20.15 |
| Calcium fluoride | 3.15 |
| Titanium dioxide | 0.7 |
| Ferromanganese | 3.1 |
| Magnesite | 2.6 |

To this mixture is added per minute through, e.g., three nozzles having a diameter of about 0.4 mm. approximately 0.3 liter of water (8 at.) while mixing until granules of the predetermined size have been formed. These granules are heated for about 20 minutes at a temperature of about 100° C. until the granules are dry. The thus dried granules are then heated at about 900° C. for about one day or until the granules are degasified. The resulting product consists of granules of the above composition, each granule having generally the same composition as every other granule.

*Example 2*

A mixture is made of particles of the following:

| | Kg. |
|---|---|
| Mullite | 26.5 |
| Clay | 13.0 |
| Calcium fluoride | 3.0 |
| Titanium dioxide | 2.0 |
| Ferromanganese | 5.25 |
| Anhydrous borax | 0.25 |

To this mixture is added per minute through, e.g., two nozzles having a diameter of about 0.6 mm. approximately 0.4 liter of water (6 at.) while agitating until granules of the predetermined size have been formed. The resulting granules are sifted through a sieve of about 20 mesh per square inch. About 80% of the granules pass through the sieve. The larger granules are again added to the fresh raw material. The granules which passed through the sieve are allowed to stand for about three days, whereupon they are heated in a rotary furnace to a temperature of about 1000° C. for about 1½ days. Any agglomerated granules are broken up. The resulting product is of uniform size and uniform composition.

*Example 3*

A mixture is made of particles of the following:

| | Kg. |
|---|---|
| Rutile | 3.5 |
| Clay | 20.0 |
| Zirconia | 5.0 |
| Calcium fluoride | 3.5 |
| Sodium silicate | 13.0 |
| Borax | 5.0 |

To this mixture is added per minute through, e.g., two nozzles having a diameter of about 0.6 mm. approximately 0.4 liter of water (6 at.) while agitating until granules of the desired size have been formed. The resulting granules are dried by heating with warm air for approximately 2 hours at a temperature of about 85° C. The dried granules are then heated for about 24 hours in a rotary furnace at a temperature of about 950° C. so as to degasify the same. Agglomerates of granules, if any, are broken up and the resulting product consists of granules of uniform composition.

*Example 4*

| | Kg. |
|---|---|
| Zirconia | 2.5 |
| Calcium oxide | 10.0 |
| Sodium fluoride | 4.0 |
| Titanium dioxide | 4.0 |
| Feldspar | 9.5 |
| Borax | 10.0 |
| Clay | 10.0 |

The above mixture is thoroughly mixed with 0.4 liter of water per minute, the water being added under the pressure of 10 at. through two nozzles having a diameter of about 0.4 mm. each. The resulting granules are dried and heated in a rotary furnace for about 2 days at a temperature of about 850° C. Agglomerates of granules are broken up and the resulting product consists of granules of substantially uniform composition.

In any of the examples illustrated such a clay has been chosen which owns sufficient binding properties as to form granules. Other suitable binding agents would have to be added otherwise.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:
1. A method for producing welding flux compositions in granular form for use in shielded arc welding, comprising the steps of
   mixing together, in dry state, finely ground divided particles essentially comprising a major portion of particles having welding flux properties,
   and directly agglomerating, by the use of a material having binding properties when wetted, the finely ground particles into individual granules of a size of about 2 millimeters maximum and corresponding to the final desired size by controlling the admixture of a liquid, in finely divided form, at a rate of about 0.1–0.8 liter per minute per each 50 kg. of mixture of particles while simultaneously therewith continuously agitating the particle mixture,
   and thereafter subjecting the thus agglomerated individual granules to a heat treatment at a temperature between the evaporization temperature of the liquid and the melting temperature of that particle of the mixture having the lowest melting temperature.

2. A method for producing welding flux compositions in granular form for use in shielded arc welding, comprising the steps of
   mixing together in dry state finely ground divided particles essentially comprising a major portion of particles having welding flux properties and a minor portion of particles having binding properties when wetted,
   directly agglomerating the finely ground particles into individual granules of predetermined size corresponding to the final desired size of about 0.3–2 mm. by controlling the admixture of a liquid, in finely divided form, at a rate of about 0.1–0.8 liter per minute per each 50 kg. of mixture of particles while simultaneously therewith continuously agitating the particle mixture,
   and thereafter subjecting the thus agglomerated individual granules to a heat treatment at a temperature substantially between the evaporization temperature of the liquid and the melting temperature of that particle of the mixture having the lowest melting temperature.

3. A method for producing welding flux compositions in granular form for use in shielded arc welding, comprising the steps of
   mixing together in dry state finely ground divided particles essentially comprising a major portion of particles having welding flux properties selected from the group consisting of mullite, alumina, silica, zirconia, titanium dioxide, beryllia, calcium oxide and mixtures thereof and additive particles selected from the group consisting of sodium silicate glass, iron oxide, borax, manganese compounds and alloys thereof, elemental and alloyed silicon, aluminum, nickel, cobalt fluorides of calcium, lithium, sodium and potassium cryolite and a minor portion of particles having binding properties when wetted,
   directly agglomerating the finely ground particles into individual granules of predetermined size corresponding to the final desired size of about 0.3 to 2 mm. by controlling the admixture of a liquid, in finely divided form, at a rate of about 0.1–0.8 liter per minute per each 50 kg. of mixture of particles while simultaneously therewith continuously agitating the particle mixture,
   and thereafter subjecting the thus agglomerated individual granules to a heat treatment at a temperature of about 900° C.–1000° C. which is the temperature between the vaporization temperature of the liquid and the melting temperature of that particle of the mixture having the lowest melting temperature.

4. A method for producing welding flux compositions in granular form for use in shielded arc welding, comprising the steps of
   mixing together in dry state finely ground divided particles essentially comprising a major portion of particles having welding flux properties, and a minor portion of particles having binding properties when wetted,
   directly agglomerating the finely ground particles into individual granules of predetermined size corresponding to the final desired size of about 0.3 to 2 mm. by controlling the admixture of a liquid, in finely divided form, at a rate of about 0.1–0.8 liter per minute per each 50 kg. of mixture of particles while simultaneously therewith continuously agitating the particle mixture,
   and thereafter subjecting the thus agglomerated individual granules to a heat treatment at a temperature of about 900° C.–1000° C. which is the temperature between the vaporization temperature of the liquid and the melting temperature of that particle of the mixture having the lowest melting temperature.

5. A welding flux composition in granular form for use in shielded arc welding essentially composed of individual granules each of a size of about 0.3 to 2 mm. and made in accordance with the method of claim 1.

References Cited by the Examiner
UNITED STATES PATENTS

| | | | |
|---|---|---|---|
| 1,684,006 | 9/28 | Bent et al. | 75—3 |
| 2,131,006 | 9/38 | Dean | 75—3 |
| 2,474,787 | 6/49 | Landis et al. | 148—24 |

DAVID L. RECK, *Primary Examiner*.
WINSTON A. DOUGLAS, *Examiner*.